United States Patent
Hoheisel

(10) Patent No.: US 10,816,498 B2
(45) Date of Patent: Oct. 27, 2020

(54) HUMIDITY SENSOR AND RELATED METHODS

(71) Applicant: Raymond Hoheisel, Arlington, VA (US)

(72) Inventor: Raymond Hoheisel, Arlington, VA (US)

( * ) Notice: Subject to any disclaimer, the term of this patent is extended or adjusted under 35 U.S.C. 154(b) by 243 days.

(21) Appl. No.: 15/989,580

(22) Filed: May 25, 2018

(65) Prior Publication Data

US 2018/0348157 A1  Dec. 6, 2018

Related U.S. Application Data

(60) Provisional application No. 62/512,321, filed on May 30, 2017.

(51) Int. Cl.
*G01N 27/22* (2006.01)

(52) U.S. Cl.
CPC ......... *G01N 27/225* (2013.01); *G01N 27/223* (2013.01); *G01N 27/228* (2013.01)

(58) Field of Classification Search
CPC ... G01N 27/225; G01N 27/223; G01N 27/228
USPC ....................................... 73/335.01
See application file for complete search history.

(56) References Cited

U.S. PATENT DOCUMENTS

| | | | |
|---|---|---|---|
| 5,511,417 A | 4/1996 | Paukkunen | |
| 6,564,633 B2 * | 5/2003 | Stormbom | G01N 27/223 73/335.05 |
| 6,724,612 B2 | 4/2004 | Davis et al. | |
| 7,175,136 B2 * | 2/2007 | Shah | B64D 15/20 244/134 F |
| 7,509,838 B2 | 3/2009 | Paukkunen | |
| 7,706,997 B2 | 4/2010 | Leppanen et al. | |
| 9,151,725 B2 * | 10/2015 | Fu | G01N 27/228 |
| 2012/0154813 A1 * | 6/2012 | Li | G01J 3/433 356/437 |
| 2012/0234078 A1 * | 9/2012 | Hagl | A61B 5/441 73/29.02 |
| 2013/0166224 A1 | 6/2013 | Carlsen, Jr. et al. | |
| 2014/0223997 A1 * | 8/2014 | Gole | B82Y 15/00 73/31.06 |
| 2016/0003975 A1 | 1/2016 | Salo et al. | |

(Continued)

OTHER PUBLICATIONS

Zurich Instruments—White Paper: Principles of lock-in detection and the state of the art. pp. 1-10. Nov. 2016.

*Primary Examiner* — Nimeshkumar D Patel
*Assistant Examiner* — Jean F Morello
(74) *Attorney, Agent, or Firm* — Banner & Witcoff, Ltd.

(57) ABSTRACT

A humidity meter includes a humidity sensor, a heating device oriented towards the humidity sensor, a signal generator capable of modulating a power output of the heating device, and a lock-in amplifier capable of demodulating a response signal of the humidity sensor as induced by the modulated heating device. A method of measuring humidity includes the steps of providing a humidity sensor positioned along a channel, a heating device positioned opposite the humidity sensor along the channel, and a controller including a signal generator and a lock-in amplifier; providing an airflow along the channel; modulating a power supply to the heating device using the signal generator; and demodulating a response signal of the humidity sensor induced by the modulated heating device.

21 Claims, 3 Drawing Sheets

(56) References Cited

U.S. PATENT DOCUMENTS

2018/0080891 A1\* 3/2018 Potyrailo ............... G01N 27/04
2019/0049370 A1\* 2/2019 Mizuuchi ........... G01N 21/8507

\* cited by examiner

HUMIDITY SENSOR AND RELATED METHODS

RELATED APPLICATIONS

This application claims priority to U.S. Provisional Application Ser. No. 62/512,321, filed on May 30, 2017, which is incorporated herein by reference in its entirety.

FIELD

Aspects of the disclosure relate to apparatuses and methods for measuring humidity in air. In particular, certain aspects are directed to humidity meters and associated methods of using humidity meters to measure relative and/or absolute humidity from an airborne vehicle.

BACKGROUND

The measurement of fine scale vertical and horizontal gradients of atmospheric water vapor concentration, or humidity, is of critical importance in the fields of environmental studies and atmospheric electromagnetic propagation research. Fine scale gradients of humidity can impact electromagnetic propagation (EMP) in the ultraviolet (UV), visible (VIS), and infrared (IR), as well as in the radar and communication wavelength bands. To resolve these gradients with adequate spatial resolution on a fast moving aircraft, a humidity meter with a fast time response is required.

On larger airplanes or other airborne vehicles, sophisticated optical instruments, such as krypton hydrometers, can be used to achieve the necessary fast response measurements (i.e., measurements made within an acceptable predetermined amount of time). However, these sophisticated optical instruments are often large and heavy, and are not practical or even feasible for use on small or medium sized airborne vehicles, such as unmanned aerial vehicles. Accordingly, it would be advantageous to have a humidity meter for small to medium sized unmanned aerial vehicles with adequate sensitivity, accuracy and response time to measure the fine scale atmospheric gradients of absolute humidity critical to assessing refractivity anomalies that impact EMP in, for example, the radar and communication wavelength bands.

One or more aspects described herein overcomes these limitations and allows the measurement of relative and absolute humidity with high accuracy, sensitivity and fast response time.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide a small size, lightweight humidity meter with a sensor that permits measurement of relative and/or absolute humidity in air with high accuracy, sensitivity, and fast response time. Such a device can be used to measure relative and absolute humidity onboard airborne vehicles for the characterization of fine scale vertical and horizontal gradients of atmospheric water vapor concentration. Other applications include industrial and residential air quality and airflow monitoring.

In accordance with a first aspect, a humidity meter includes a humidity sensor and a heating device oriented towards the humidity sensor. A signal generator is configured to modulate a power output of the heating device, and a lock-in amplifier is configured to demodulate a response signal of the humidity sensor as induced by the modulated heating device.

In accordance with another aspect, a humidity meter may include one or several capacitive humidity sensors, a heating device, a temperature sensor, a pressure sensor, a function generator, a lock-in amplifier and a microcontroller.

In accordance with yet another aspect, the response signal of a capacitive humidity sensor as induced by the modulated heating device may be a change in the capacitance of the humidity sensor; and a lock-in amplifier may be configured to demodulate and measure the said response signal.

In accordance with a further aspect, a method of measuring humidity includes the steps of providing a humidity sensor positioned along a channel, a heating device positioned opposite the humidity sensor along the channel, and a controller including a signal generator and a lock-in amplifier; providing an airflow along the channel; modulating a power supply to the heating device using the signal generator; and demodulating a response signal of the humidity sensor induced by the modulated heating device.

Some advantages of one or more aspects described herein include fast response time, high accuracy and sensitivity, light weight, low cost, low power consumption, and a lack of moving parts. This permits the usage of humidity meters on small and medium sized unmanned aerial vehicles (UAV) to improve electromagnetic maneuver warfare (EMW) and intelligence, surveillance and reconnaissance (ISR) sensor performance prediction, as well as weather hazard sensing, avoidance and mitigation, and forecasting These and additional features and advantages will be apparent to those skilled in the art, that is, those who are knowledgeable or experienced in this field of technology, in view of the following disclosure and detailed description of certain exemplary embodiments.

BRIEF DESCRIPTION OF THE DRAWINGS

The present disclosure is illustrated by way of example and not limited in the accompanying figures in which like reference numerals indicate similar elements and in which.

Figure 1:
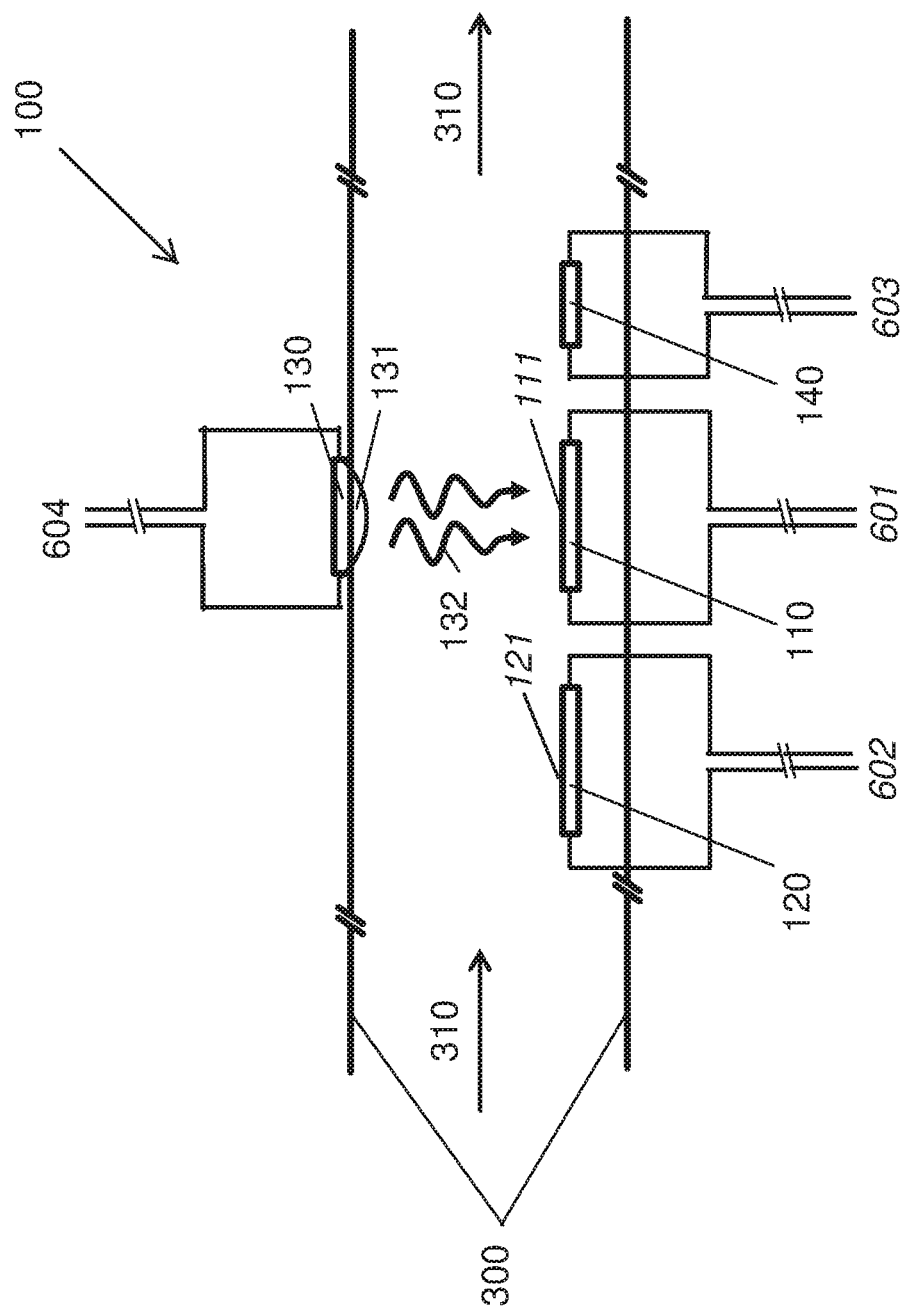
FIG. 1 is a schematic view of a humidity meter according to one or more illustrative embodiments described herein.

The figures referred to above are not drawn necessarily to scale and should be understood to provide an representation of certain embodiments, illustrative of the principles involved. Some features of the humidity meter depicted in the drawings have been enlarged or distorted relative to others to facilitate explanation and understanding. The same reference numbers are used in the drawings for similar or identical components and features shown in various alternative embodiments. Humidity meters as disclosed herein would have configurations and components determined, in part, by the intended application and environment in which they are used.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

An illustrative embodiment of a humidity meter 100 is seen in FIG. 1. Humidity meter 100 may include a humidity sensor 110. In certain embodiments, humidity meter 100 may include an additional humidity sensor 120 in order to provide redundancy for the system of humidity meter 100. It is to be appreciated that in certain embodiments, humidity meter 100 may include more than two humidity sensors.

A front surface 111 of humidity sensor 110 is exposed to air to be measured. The air to be measured may flow through a channel 300 in direction 310, which as seen in FIG. 1 flows from left to right. In certain embodiments, channel 300 may be housed in a UAV (not shown) in order to measure the humidity in the air during flight.

In certain embodiments, humidity sensor 110 may be a capacitive humidity sensor. An exemplary humidity sensor is the P14 Rapid capacitive humidity sensor provided by Innovative Sensor Technologies of Switzerland. In certain embodiments, multiple humidity sensors of the same type may be used in humidity meter 100. In other embodiments, humidity sensors of different types may be used together in humidity meter 100.

The front surface 111 of humidity sensor 110 may be oriented toward, or face, a heating device 130. Heating device 130 may be a radiative device, e.g., an optical light emitting device such as a light emitting diode (LED). In other embodiments, heating device 130 may be a laser, an incandescent light bulb, or another electromagnetic (EM) frequency emitting device. Other suitable heating devices 130 will become readily apparent to those skilled in the art given the benefit of this disclosure.

In certain embodiments, humidity meter 100 may include an additional sensor 140. Additional sensor 140 may be configured to measure at least one of the temperature, pressure, and velocity of airflow 310.

In certain embodiments, humidity sensors 110, 120 and additional sensor 140 may have a width of approximately 5 mm, a length of approximately 5 mm, and a height of approximately 1 mm. It is to be appreciated that humidity sensors 110, 120 and additional sensor 140 may have a rectangular or circular shape. Other suitable shapes for humidity sensors 110, 120 and additional sensor 140 will become readily apparent to those skilled in the art, given the benefit of this disclosure.

As used herein, the term "approximately" is intended to mean "close to" or "about" a particular value, within the constraints of sensible, commercial engineering objectives costs, manufacturing tolerances, and capabilities in the field of humidity meter manufacture and use.

Electrical connector wires 601, 602, 603 and 604 may be connected to humidity sensor 110, additional humidity sensor 120, additional sensor 140, and heating device 130, respectively, to provide electrical power, as well as data transfer functionality to and from a controller 600, seen in FIG. 2 and discussed in greater detail below.

The components of humidity meter 100 may be positioned along a channel 300. In particular, humidity sensor 110 may be positioned opposite heating device 130 along channel 300. In certain embodiments, channel 300 has a circular cross-section. It is to be appreciated that channel 300 may have other cross-sectional shapes such as rectangular, for example. Other suitable cross-sectional shapes for channel 300 will become readily apparent to those skilled in the art, given the benefit of this disclosure.

In certain embodiments, channel 300 may have a diameter of approximately 15 mm. However, it is to be appreciated that the diameter of channel 300 may be larger or smaller than 15 mm.

Heating device 130 serves to warm humidity sensor 110, which helps to improve the performance of humidity sensor 110 and, therefore, humidity meter 100. It is to be appreciated that humidity sensor 110 is less effective and has a poor response time when operating at cold temperatures (e.g., below approximately 32° F.). Heating humidity sensor 110 can improve its response time. In certain embodiments, humidity sensor 110 may have an optimal response time when heated to between approximately 80° F. and approximately 90° F. Optimizing the response time of humidity sensor 110 may provide increased accuracy for humidity meter 100.

Heating device 130 may be located and oriented towards humidity sensors 110, 120 such that front surfaces 111, 121 of humidity sensors 110, 120, respectively, may be exposed to the emitted radiation 132 of heating device 130. A lens 131 may be used to focus the emitted radiation of heating device 130 towards humidity sensors 110, 120 and additional sensor 140.

In certain embodiments, heating device 130 with lens 131 may have a length and width of between approximately 5 mm and approximately 10 mm, and a thickness of between approximately 1 mm and approximately 3 mm.

When heating device 130 is turned on, the emitted radiation 132 of heating device can be absorbed by humidity sensor 110 and may lead to an increase of the temperature of front surface 111 of humidity sensor 110. The emitted radiation 132 may also lead to an increased rate of evaporation/desorption of water initially contained in humidity sensor 110 through front surface 111, or another surface of humidity sensor 110.

The rate of water absorption/evaporation/desorption induced by heating device 130 may be dependent on various factors, including, but not limited to, the temperature of the air, the temperature of humidity sensor 110, and/or the humidity of the surrounding air. Thus, for known environmental parameters such as the temperature of humidity sensor 110, and/or the temperature of the surrounding air, a characteristic and humidity dependent response of humidity sensor 110 occurs when heating device 130 is turned on.

In order to improve the performance of humidity meter 100, a lock-in measurement technique may be used, which may increase the accuracy of the device by filtering out the induced signal of heating device 130 imposed at a desired modulation frequency. In order to implement the lock-in measurement, heating device 130 may be switched on and off at a desired modulation frequency to provide modulated heating of humidity sensor 110, and/or modulated evaporation/desorption of water initially contained in humidity sensor 110. In certain embodiments, the desired modulation frequency may be of the order of several hundreds of Hertz. In certain embodiments, the modulation frequency can be higher than several hundreds of Hertz, while in other embodiments, the modulation frequency can be lower than several hundreds of Hertz. The lock-in measurement technique provides improved signal to noise ratio, faster signal response time, and temperature stabilization of humidity sensor 110 as compared to a humidity sensor without modulated heating and without the application of lock-in measurement.

With heating device 130 being a radiative device, e.g., an optical light emitting device such as a light emitting diode (LED) or a laser, a higher modulation frequency can be achieved in comparison to a resistive heating element. A resistive heating element may also have to be physically attached/connected to the humidity sensor, which may result in increased thermal mass and reduced sensor accuracy and response time.

Figure 2:
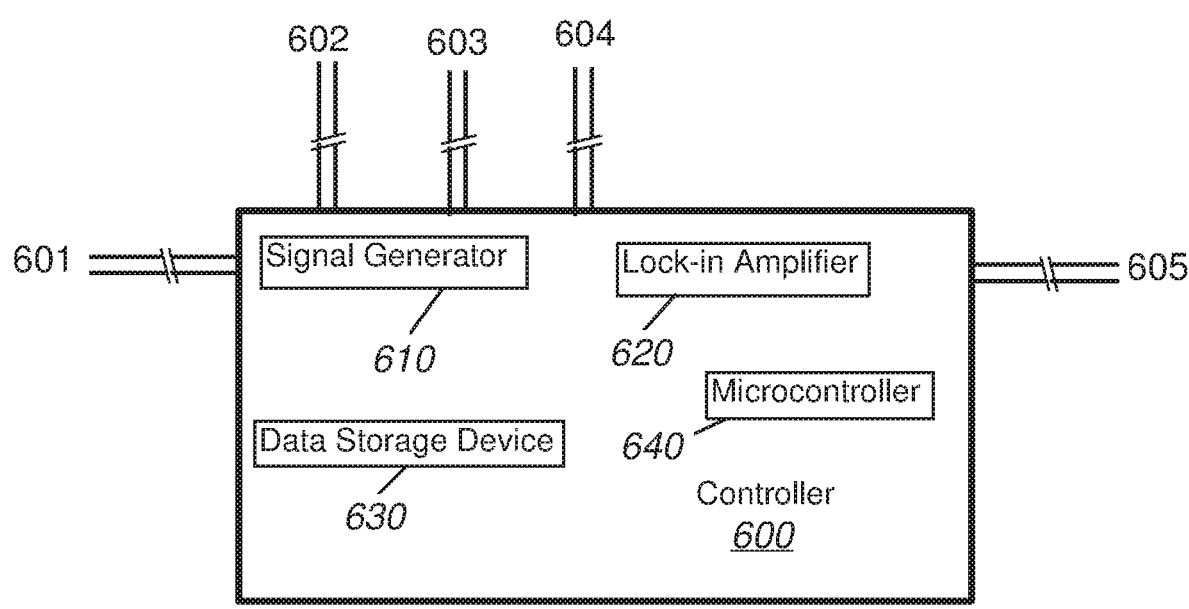
FIG. 2 is a schematic view of a controller of the humidity meter of FIG. 1.

An exemplary controller 600 for use with humidity meter 100 is illustrated in FIG. 2. As seen here, controller 600 is connected via electrical connector wires 601, 602, 603 and 604 to humidity sensor 110, additional humidity sensor 120, additional sensor 140, and heating device 130, respectively. Electrical connector wires 605 can be used for external control and data exchange with controller 600.

Controller 600 may contain a function or signal generator 610 that is used to control the power output of heating device 130. Controller 600 may include a lock-in amplifier 620, or an otherwise suitable amplifier, for the demodulation of the response signal of humidity sensor 110 as induced by heating device 130. It is to be appreciated that lock-in amplifier 620 may also read the signal of humidity sensor 110, or additional humidity sensor 120, when heating device 130 is permanently/predominantly turned off or turned on, i.e. when heating device 130 is operating in unmodulated operation.

Controller 600 may also include a data storage device 630 for storage of collected data. Controller 600 may also include a microcontroller 640. Microcontroller 640 may be any type of microprocessor-based system, and controller 600 may include computing hardware and software that may host various data and applications for performing tasks related to operation of heating device 130 and capturing readings of humidity sensor 110.

Microcontroller 640 may include instructions to calculate relative and absolute humidity based on stored calibration data and readings of humidity sensor 110. Microcontroller 640 may also include readings from additional sensor 120, and readings from the additional sensor 140 in calculating relative and absolute humidity.

Figure 3:
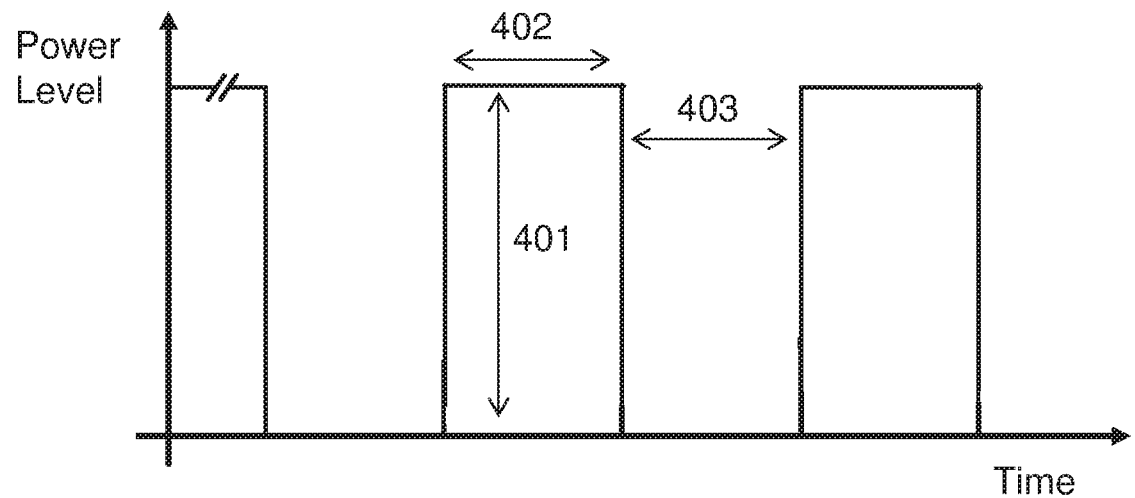
FIG. 3 is a graph illustrating a switching sequence of a heating device of the humidity meter of FIG. 1.

FIG. 3 illustrates a method of operating humidity meter 100. In operation, the method includes providing humidity sensor 110 and heating device 130 opposite humidity sensor 110 along channel 300, as well as controller 600 including signal generator 610 and lock-in amplifier 620. Airflow is then provided along channel 300. In embodiments where humidity meter 100 is used on an aircraft, such as a UAV, the airflow is provided when the UAV is in flight.

Signal generator 610 of controller 600 is then used to modulate a power supply to heating device 130. A response signal of humidity sensor 110 induced by modulation of heating device 130 is then demodulated with lock-in amplifier 620 of controller 600.

The power modulation of heating device 130, i.e. the time resolved sequence of switched on and switched off states, allows for the usage of the lock-in measurement technique. As illustrated here, during the step of modulating, heating device 130 may be switched on for a first defined duration of time 402 at a defined power level 401, and is then switched off for a second defined duration of time 403. This process may then be repeated as desired. In certain embodiments, the first defined duration of time 401 is the same amount of time as the second defined duration of time. The lock-in measurement technique is applied according to the modulation frequency defined by duration of time 402 and duration of time 403.

Figure 4:
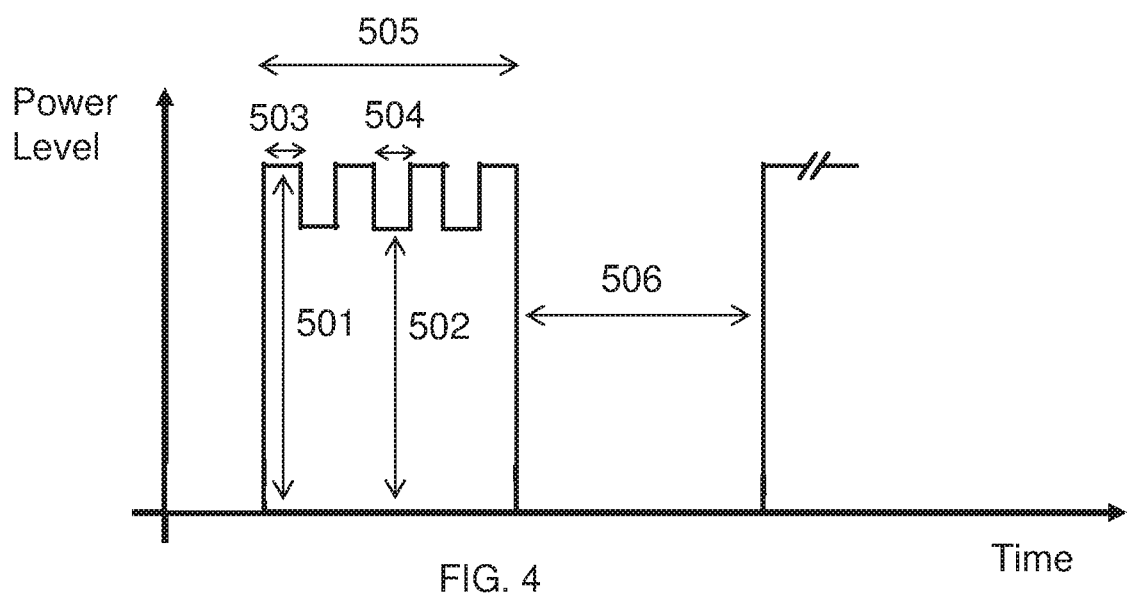
FIG. 4 is a graph illustrating an alternative embodiment of a switching sequence of the heating device of FIG. 1.

FIG. 4 shows an alternative embodiment of the modulating step. In this embodiment, an additional modulation frequency can be applied by repetitive variation of a power level applied to heating device 130. As illustrated here, the power lever may be alternated between a first level 501 for a first defined duration of time 503, and a second, lower, level 502 for a second defined duration of time 504, for a total third duration of time 505, after which heating device 130 is turned off for a fourth defined duration of time 506. The lock-in technique in this embodiment of the modulating step is applied according to the modulation frequency defined by durations of time 503, 504, 505 and 506.

It is to be appreciated that the modulation of power supplied to heating device 130 can be accomplished in a variety of different manners. Specifically, power can be supplied to heating device 130 at various modulation frequencies for various different durations of time. Further, the power levels can be supplied using various patterns and signal forms, and various amplitude and/or frequency functions can be applied to heating device 130. It is to be appreciated that such functions may include, but are not limited to, sinusoidal, logarithmic and triangular functions.

In other embodiments, no signal modulation of heating device 130 is employed, i.e. heating device 130 is predominantly switched off and/or predominantly switched on, in which case the humidity is directly measured via a dedicated readout circuit, i.e. unmodulated measurement.

In certain embodiments, humidity meter 100 can be operated in alternating modes of modulated measurements and unmodulated measurements.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A humidity meter comprising:
   a humidity sensor;
   a heating device oriented towards and spaced from the humidity sensor;
   a signal generator configured to modulate a power output of the heating device; and
   an amplifier configured to demodulate a response signal of the humidity sensor as induced by the modulated heating device.

2. The humidity meter of claim 1, further comprising an additional sensor configured to measure at least one of a temperature, a pressure, and a velocity of an airflow.

3. The humidity meter of claim 1, further comprising an additional humidity sensor.

4. The humidity meter of claim 1, further comprising a channel, the humidity sensor and heating device positioned opposite one another along the channel.

5. The humidity meter of claim 1, wherein the heating device includes a lens.

6. The humidity meter of claim 1, wherein the heating device is an optical emitting device.

7. The humidity meter of claim 1, further comprising a controller configured to control operation of the signal generator and lock-in amplifier.

8. The humidity meter of claim 7, wherein the controller includes a data storage device.

9. The humidity meter of claim 1, wherein the signal generator is configured to alternately switch the heating device on for a first defined duration of time at a defined power level and off for a second defined duration of time.

10. The humidity meter of claim 1, wherein the signal generator is configured to alternately power the heating device at a first defined power level for a first duration of time and a second defined power level for a second defined duration of time for a total third duration of time, and then power off the heating device for a fourth period of time.

11. The humidity meter of claim 1, wherein the amplifier is configured to read a signal of the humidity sensor when the heating device is operating in an unmodulated operation.

12. A humidity meter comprising:
a channel;
a humidity sensor positioned along the channel;
a heating device positioned opposite the humidity sensor along the channel;
a controller configured to control the heating device and including:
a signal generator capable of modulating a power output of the heating device; and
a lock-in amplifier capable of demodulating a response signal of the humidity sensor as induced by the modulated heating device.

13. The humidity meter of claim 12, wherein the heating device includes a lens.

14. A method of measuring humidity comprising the steps of:
providing a humidity sensor positioned along a channel, a heating device positioned opposite the humidity sensor along the channel, and a controller including a signal generator and a lock-in amplifier;
providing an airflow along the channel;
modulating a power supply to the heating device using the signal generator; and
demodulating a response signal of the humidity sensor induced by the modulated heating device.

15. The method of claim 14, wherein the modulating step comprises alternately switching the heating device on for a first defined duration of time at a defined power level and off for a second defined duration of time.

16. The method of claim 14, wherein the modulating step comprises alternately powering the heating device at a first defined power level for a first duration of time and a second defined power level for a second defined duration of time for a total third duration of time, and then powering off the heating device for a fourth period of time.

17. The method of claim 14, further comprising the step of measuring at least one of a pressure, a velocity, and a temperature of the airflow with an additional sensor.

18. The method of claim 14, further comprising the step of measuring the humidity of the airflow with an additional humidity sensor.

19. The method of claim 14, further comprising the step of focusing emitted radiation from the heating device toward the humidity sensor with a lens.

20. The method of claim 14, wherein the heating device includes a lens.

21. The method of claim 14, wherein the heating device is an optical emitting device.

* * * * *